United States Patent [19]
de Montmollin et al.

[11] Patent Number: 4,872,114
[45] Date of Patent: Oct. 3, 1989

[54] METHOD OF PROCESSING EXCITATION RESPONSE OF A SHAKER DISPOSED WITHIN A TOOL TO OBTAIN AN EQUALIZED SEISMIC SIGNAL

[75] Inventors: Vincent de Montmollin, Paris; Yves Brun, Malakoff, both of France

[73] Assignee: Schlumberger Technology Corporation, New York, N.Y.

[21] Appl. No.: 191,931

[22] Filed: May 6, 1988

[30] Foreign Application Priority Data

May 6, 1987 [FR] France .............................. 87 06331

[51] Int. Cl.$^4$ .......................... G01V 1/16; G01V 1/18
[52] U.S. Cl. ................................. 364/421
[58] Field of Search .................... 364/421, 422; 73/151

[56] References Cited

U.S. PATENT DOCUMENTS

3,518,678  6/1970  Lawrence et al. .................... 367/67

FOREIGN PATENT DOCUMENTS

0210925  2/1987  European Pat. Off.
1495767 12/1977  United Kingdom.
1569581  6/1980  United Kingdom.

OTHER PUBLICATIONS

French application Search Report for FR 2614996 published Nov. 1988, based on application No. FR 8706331.
de Montmollin, V., "Shaker Tests on Downhole Seismic Tools", *Geophysics*, vol. 53, No. 9, Sep. 1988, 1160–68.
Duennebier, F. K. et al., "A Simple Shaker Table for Seismometer Calibration", *Marine Geophysical Researches*, vol. 6, No. 3, 1984, 311–328.

*Primary Examiner*—Clark A. Jablon
*Attorney, Agent, or Firm*—Clifford L. Tager

[57] ABSTRACT

A method of processing seismic signals detected by at least one sensor disposed in a tool lowered down a borehole, the seismic signals Sj(t) being recorded at different depths j of the tool in response to the propagation of seismic waves through the formations surrounding the borehole, the method making use of the signals Shj(t) detected by the sensor at each depth j in response to excitation from a shaker disposed inside the tool, the method being characterized by the fact that it comprises the following operations: a reference signal Shref(t) is defined for the excitation response produced by the shaker; a deconvolution function Dj(t) is calculated for each signal Shj(t) picked up at depth j in response to the excitation produced by the shaker in such a manner that the signal Shj(t) picked up at this depth after being convoluted with said deconvolution function Dj(t) gives the reference signal Shref(t); and the deconvolution function Dj(t) corresponding to depth j is applied to each seismic signal Sj(t) picked up at said depth j in order to obtain an equalized seismic signal Sjeg(t).

5 Claims, 4 Drawing Sheets

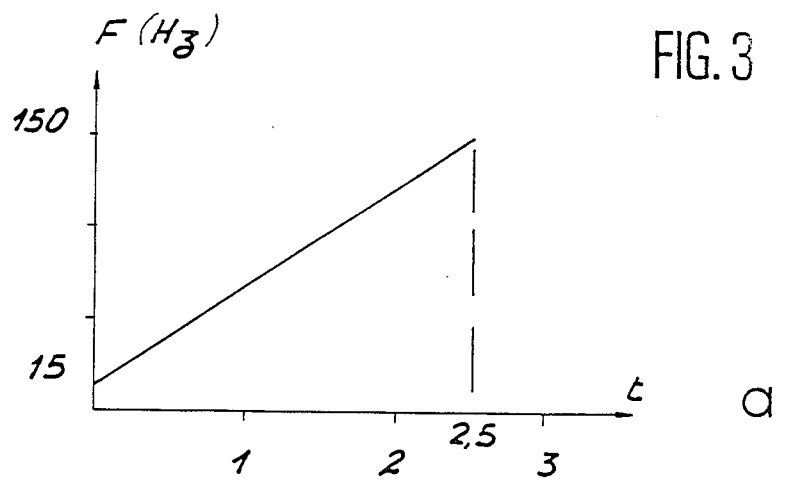
FIG. 3 a
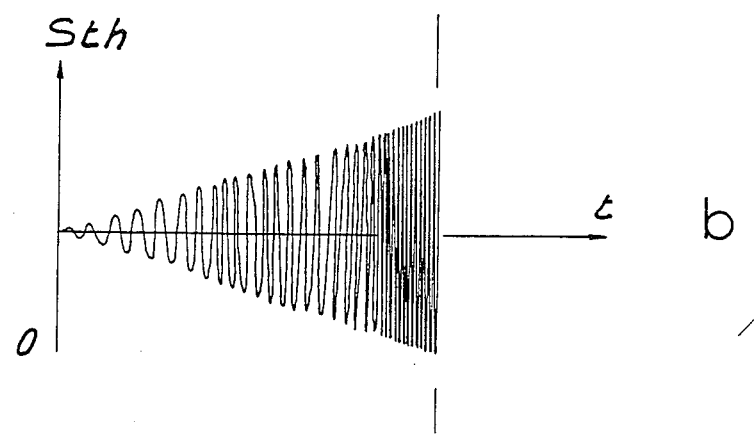
b
FIG. 8
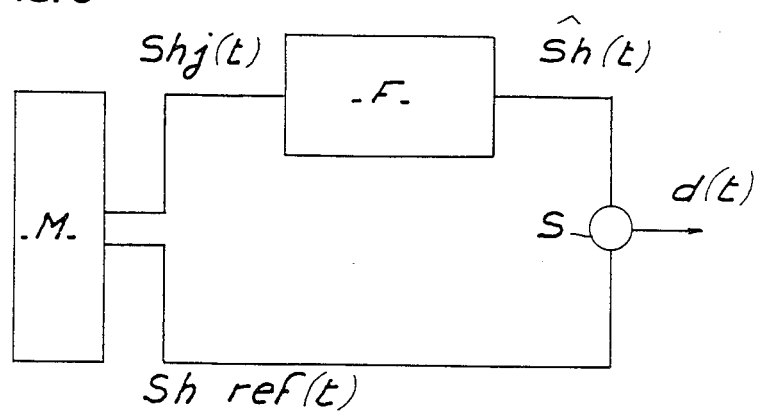

a  Sh ref(t)

b  Sj(t)

c  Shj(t)

d  Sj eg(t)

METHOD OF PROCESSING EXCITATION RESPONSE OF A SHAKER DISPOSED WITHIN A TOOL TO OBTAIN AN EQUALIZED SEISMIC SIGNAL

The present invention is directed to seismic signal processing. More particularly, the present invention is directed to a method of processing seismic signals having a particular utility in geophysical prospecting.

The technique of seismic exploration using a borehole is now widespread. As illustrated in FIG. 1, borehole 12 is drilled into geological formations 10 and seismic detection tool 14 is lowered down the borehole by means of cable 15 which also provides electrical connections to equipment on the surface.

Tool 14 has an outside diameter which is less than the inside diameter of borehole 12. When the tool is at a selected depth, arm 16 is deployed and shoe 17 bears against the formation in order to press the tool against the wall of the borehole. Contact may be further improved by using wedges 18 disposed diametrically opposite to the shoe.

On the surface, seismic source 20, such as a vibrator or an air gun, generates excitation which shakes the geological formation. Various types of wave (e.g., compression waves, shear waves, Stoneley waves) propagate through the formation and around the borehole. Tool 14 includes sensors, such as geophones, which are capable of detecting movement in the formation. A geophone generally comprises a magnet fixed in a moving conducting coil. The movement of the coil induces an electrical current therein. The speed of formation displacement is thus converted into an electrical voltage.

In general, three geophones are typically disposed in the tool having their axes directed along three mutually perpendicular directions X, Y, and Z of a frame of reference. FIG. 2 shows three geophones 21, 22 and 23. The Z-axis is parallel to the axis of the tool, i.e. it is vertical in the operating position. The X-axis is horizontal and directed towards fixing arm 16, and the Y-axis is also horizontal but is directed perpendicularly to the X-axis.

Means for detecting, recording and processing the signal are disposed on the surface, generally on board vehicle 30. The processing serves to discover information about the nature and the structure of the geological formations under investigation. In fact, the motion of the tool is not always a faithful copy of the motion of the surrounding formation because of imperfect coupling between the formation and the tool. Since the coupling changes from one point to another along the tool and also from one borehole to another, it is often difficult to make comparisons between the different samples obtained. Unfortunately, the technique of seismic prospecting specifically requires signals corresponding to different measurement depths to be compared with one another. That is how the interfaces between geological layers can be identified.

The problem of imperfect coupling between the tool and the formation is not new. Proposals have been made to study it by putting a "shaker" in the tool. A shaker may be constituted by a geophone which is excited by an alternating voltage. The vibrations generated by the shaker excite the tool and its geophones and the surrounding formation. By measuring the signals delivered by the geophones it is then possible to monitor the coupling conditions between the tool and the formation. In general, the shaker axis is disposed parallel to the trisector of the frame reference XYZ constituted by the axes of the three geophones. In FIG. 2, a shaker is shown with reference to reference 30 and its axis is referenced as S.

This technique is described, for example, in the article by H. Washburn and H. Wiley entitled "The Effect of the Placement of a Seismometer on its Response Characteristics" published in Geophysics, 6, 116–132, 1941. The technique is also described in U.S. Pat. No. 3,777,814 issued to C. A. Gustavson et al on Dec. 11, 1973. Both references are herein incorporated by reference.

In these references, recourse to a shaker is recommended in order to monitor the coupling conditions qualitatively, but not for providing a quantitative correction to a signal which is measured using poor coupling. However, in the work entitled "Handbook of Geophysical Exploration" Section I: "Seismic Exploration", vol. 14A, "Vertical Seismic Profiling, Part A: Principles" by B. A. Hardage, published by Geophysical Press 1983, herein incorporated by reference, an allusion is made to signal processing making use of the responses to shaker excitation in such a manner that transmission properties of the geophone/formation interface are made of depth.

The present invention proposes a particular form of signal processing which makes use of this general idea of exploiting the information contained in the signal which is obtained in response to excitation by a shaker.

In the prior art, the tool containing the shaker is considered as being perfectly rigid. However, this assumption is not true when the tool is more than several tens of centimeters long, which is typically the case in practice. In such long structures there are always intrinsic modal vibrations which disturb measurement, and which are to be added to the disturbances related to anomalies in tool/formation coupling. The present invention provides a method which makes it possible to take account of both of these types of disturbance.

More precisely, the present invention provides a method of processing seismic signals detected by at least one sensor disposed in a tool lowered down a borehole, the seismic signals $Sj(t)$ being recorded at different depths j of the tool in response to the propagation of a seismic wave through the formations surrounding the borehole, the method making use of the signals $Shj(t)$ detected by the sensor at each depth j in response to excitation from a shaker disposed inside the tool, the method comprises the following operations:

a reference signal $Shref(t)$ is defined for the excitation response produced by the shaker;

a deconvolution function $Dj(t)$ is calculated for each signal $Shj(t)$ picked up at depth j in response to the excitation produced by the shaker in such a manner that the signal $Shj(t)$ picked up at this depth after being convoluted with the deconvolution function $Dj(t)$ gives the reference signal $Shref(t)$; and the deconvolution function $Dj(t)$ corresponding to depth j is applied to each seismic signal $Sj(t)$ picked up at the depth j in order to obtain an equalized seismic signal $Sjeg(t)$.

In a first variant, the reference signal $Shref(t)$ is synthesized.

In a second variant, the reference signal $Shref(t)$ is selected from one of the signals $Shj(t)$ picked up at different depths j which is considered as being closest in appearance to the ideal signal. In this case, the invention is more like an "equalization" method than a correction method in that the disturbances due to tool/formation coupling and to possible tool vibration are not completely eliminated but are merely reduced to the values they take when the tool is at a determined depth which is taken as the reference depth. Naturally, this depth corresponds to a situation where these disturbances are as small as possible. Thus, after "equalization" of all of the signals relative to one of them which is taken as the reference signal, it is possible to perform seismic analysis with accuracy.

FIGS. 3a and 3b respectively show variation in the frequency of the shaker excitation signal; and the ideal output signal which ought to be obtained from a geophone.

FIGS. 4a to 4d are a set of graphs respectively showing: a response signal to the shaker taken as a reference signal; an ordinary seismic trace; an ordinary response signal to the shaker; and an equalized seismic trace.

FIGS. 5a to 5d are respectively a seismic trace; the signal corresponding to the shaker response which is taken as the reference; and the spectrums of these two signals.

FIGS. 6a to 6d are respectively an ordinary seismic trace in need of correction; the corresponding response signal to the shaker; and the spectrums of these signals.

FIGS. 7a to 7d are respectively the trace of a corrected seismic signal; the corrected shaker response signal; and the spectrums of these signals.

FIG. 8 shows a block diagram of the preferred embodiment of the device to calculate the deconvolution function.

FIGS. 3a and 3b show one possible excitation mode of the shaker and the resulting signal which ought to appear from the geophone assuming that the tool were ideal (i.e. without any resonances of its own and perfectly coupled to the formation). The shaker is excited by an electric voltage of constant amplitude whose frequency varies with the slope shown in FIG. 3a. The frequency is 15 Hz at the bottom of the slope and it rises to 150 Hz at the top, for example. Its duration may be 2.5 seconds, for example. Naturally, these characteristics are not limiting in any way.

It can be shown that in the ideal case of a weight put into motion and coupled to the ground via an elastic element with friction, the motion of the weight is transferred to the ground in a manner which is directly proportional to the excitation frequency of the weight. A geophone ought therefore to deliver a signal whose amplitude increases linearly from 0 seconds to 2.5 seconds, and whose frequency follows the slope shown in FIG. 3a. This theoretical signal Sth is shown in FIG. 3b.

Such a signal can be synthesized, and then used as a reference signal. Although this gives rise to effective correction, such a solution nevertheless suffers from the drawback of eliminating anomalies which ought not to be corrected. For example, the sensitivities of the various measurement paths may be different without there being any requirement to correct these differences.

That is why it is preferred to use a more empirical method which is now described.

Figures 1, 2:
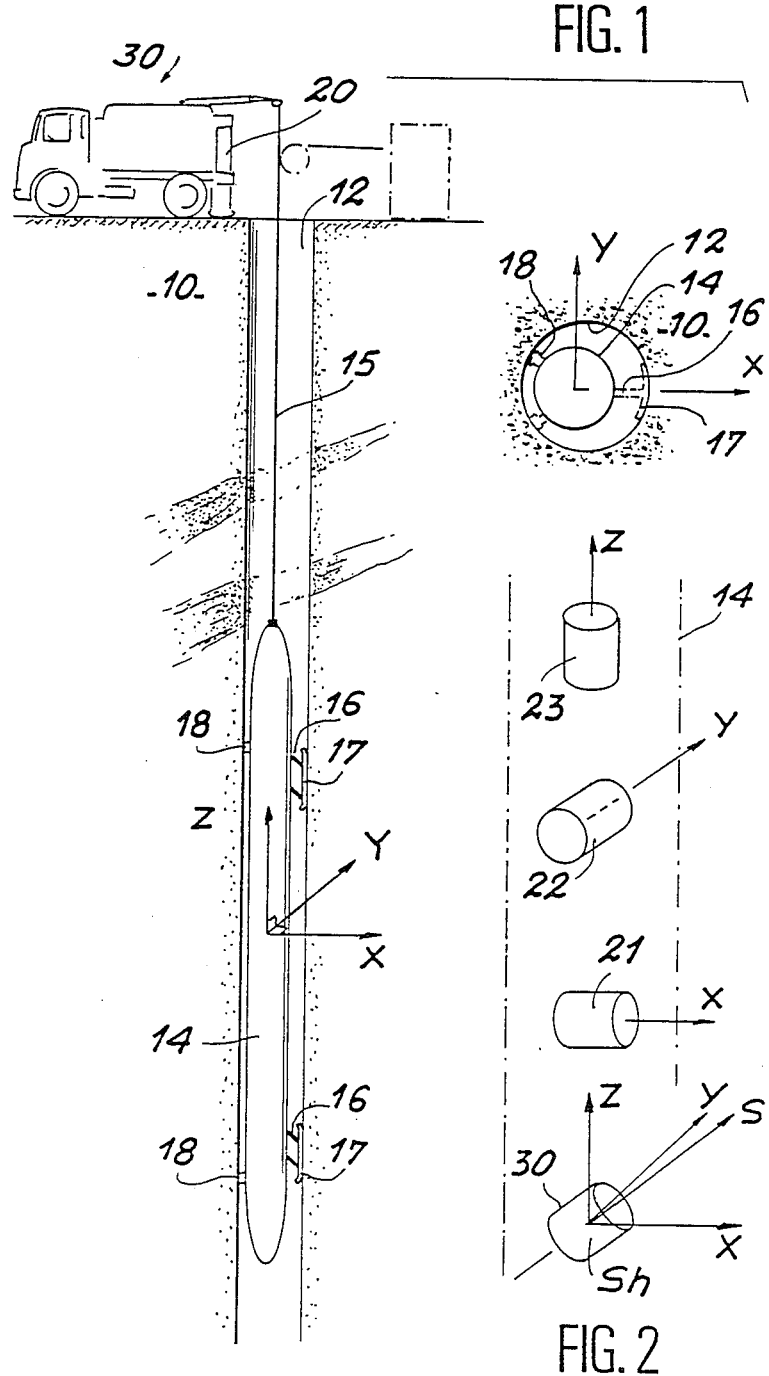
FIG. 1 illustrates the technique of seismic exploration.
FIG. 2 shows the relative positions of the geophones and of the shaker.
Figure 4:
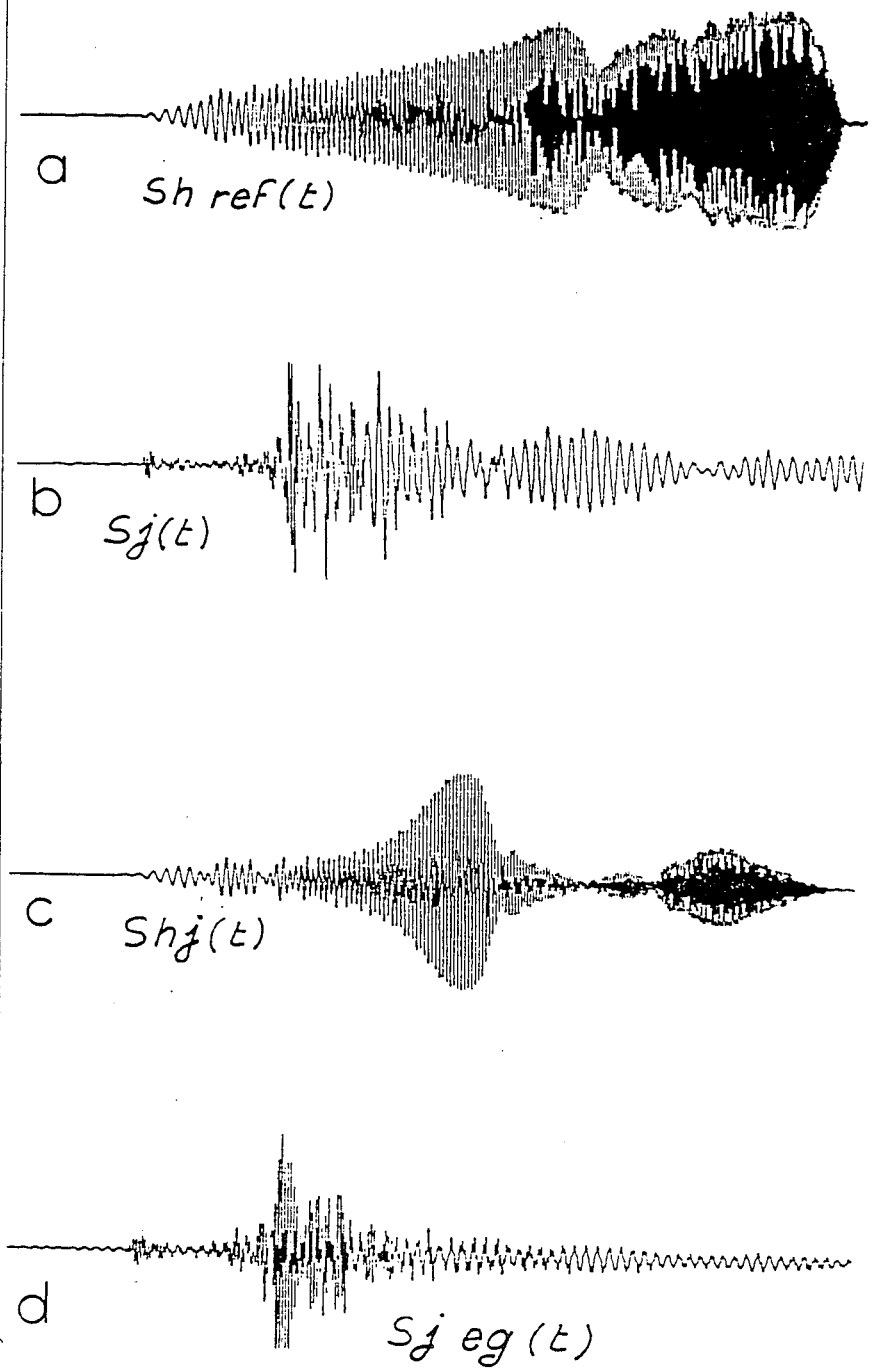
Figure 5:
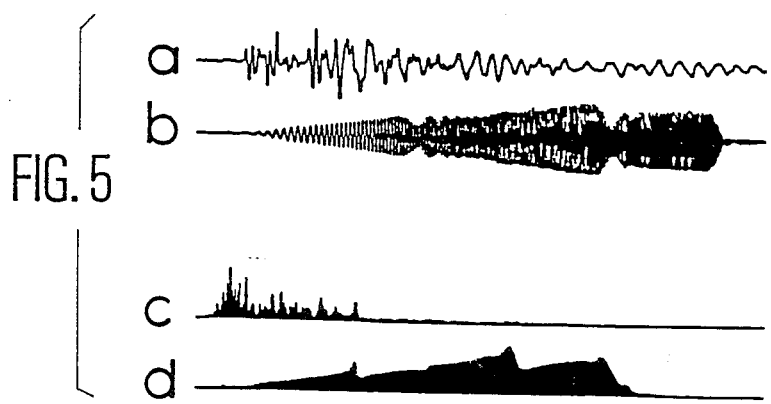
Figure 6:
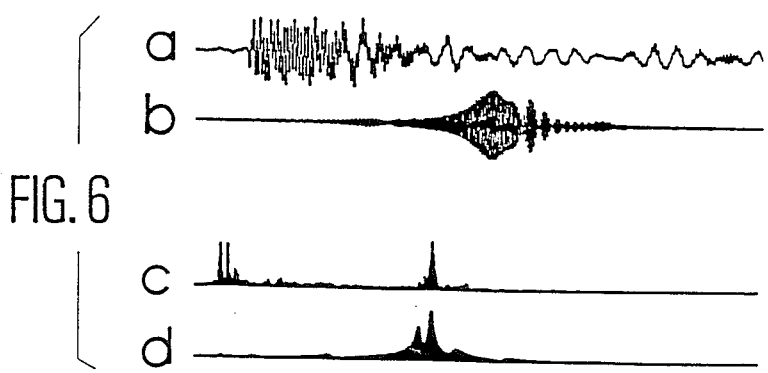
Figure 7:
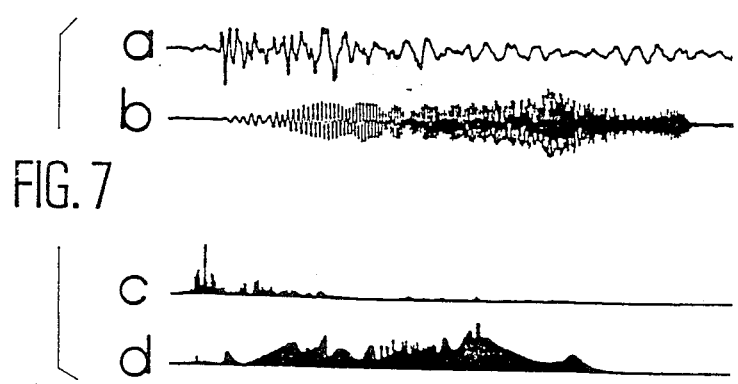

FIGS. 4a to 4d show various traces that enable the principle of this variant of the method in accordance with the present invention to be understood. FIG. 4a shows the response delivered by one of the geophones to the excitation generated by the shaker plotted as a function of time (which runs from left to right). This response is fairly close to the ideal response of FIG. 3b except for a disturbance which is visible towards the middle of the trace and which corresponds to resonance situated at about 100 Hz. This is a signal which is used as the reference signal and which is designated below as Shref(t).

FIG. 4b shows the trace of an ordinary seismic signal recorded at some depth j, which is different from the depth corresponding to the reference signal shown in FIG. 4a. This signal, referenced Sj(t), is the signal which is to be equalized.

The responses of the geophones to excitation produced by the shaker are also recorded at this depth j. The corresponding response is shown in FIG. 4c and is referenced Shj(t). It can be seen that this response is considerably different from the theoretical response shown in FIG. 3b and is fairly different from the reference response shown in FIG. 4a. A low frequency resonance can be observed in the middle of the trace followed by an attenuation in the third fourth of the trace.

The signal shown in FIG. 4d is an equalized seismic signal, referenced Sjeg(t), which is obtained in the following manner.

The signal Shj(t) shown in FIG. 4b may be considered as being the convolution of the signal Shref(t) of FIG. 4a as produced by the filter which is equivalent to the tool-formation assembly. This can be written symbolically as follows:

Shref(t)*C(t) = Shj(t)

in which the symbol * represents a convolution product, and C(t) is the convolution function of the tool-formation assembly.

The seismic signal is also affected by this filter so that instead of obtaining a theoretical signal Sjth(t) the following real signal Sj(t) is obtained:

Sj(t) = Sjth(t)*C(t).

This is the signal shown in FIG. 4b.

In order to obtain the theoretical signal Sjth(t), it is necessary to determine the deconvolution D(t) which is the inverse of C(t), and to perform a convolution product with the measured signals:

Sjth(t) = Sj(t)*D(t).

This deconvolution function may be determined by knowing the response Shj(t) to the shaker and the reference response Shref(t).

According to the present invention, the deconvolution function Dj(t) is calculated so that:

Shj(t)*Dj(t)-Shref(t).

Once Dj(t) has been calculated (by methods which are described below), this function is applied to the seismic signal to be equalized as shown in FIG. 4b. An equalized seismic signal Sjeg(t) is thus obtained:

Sjeg(t) = Sj(t)*Dj(t).

This is the signal shown in FIG. 4d. It can be seen, by comparing it with the trace of FIG. 4b, that the low frequencies which spoil the original trace have been eliminated.

FIGS. 5a to 7d recapitulate the above considerations in part, but they also add information relating to the spectrums of the various signals.

FIG. 5a shows a seismic trace and FIG. 5b shows the response to the shaker as measured at the same depth. FIGS. 5c and 5d show the frequency spectrums of these two signals.

This set of signals corresponds to a measurement depth in which the tool/formation coupling is relatively good since the signal of FIG. 5b is close to the theoretical signal and its spectrum is close to the spectrum of the slope in FIG. 3a, (except for two resonances at about 60 Hz and at about 100 Hz).

Similarly, FIG. 6b shows a seismic trace and FIG. 6b shows the response to the shaker as observed at the same depth, while FIGS. 6c and 6d show the spectrums of these two signals. These spectrums show peaks at about 90 Hz.

FIGS. 7a and 7b show these signals after equalization (i.e. FIG. 7a shows the seismic signal and FIG. 7b shows the shaker response). The spectrum shown in FIG. 7d of the equalized shaker response is still different from an ideal triangular distribution, however it is closer to the reference spectrum shown in FIG. 5d. The spectrum of the equalized seismic signal shown in FIG. 7c has lost its signal at 90 Hz, and now includes a low frequency portion situated around 30 Hz to 40 Hz.

There are several methods that may be used for calculating the deconvolution function Dj(t). One of these methods is the so-called Wiener-Levinson method. It is described in the work by L. R. Rabiner and B. Gold entitled "Theory and Application of Digital Signal Processing" published by Prentice-Hall, and in the work by Claerbout entitled "Fundamentals of Geophysical Data Processing with Application to Petroleum Prospecting" published by McGraw Hill in "International Series in the Earth and Planetary Sciences". Both works are herein incorporated by reference.

FIG. 8 shows a block diagram of the preferred apparatus for implementing this method. Memory M delivers digital samples of reference signal Shref(t) and ordinary signal Shj(t). Digital filter F receives the ordinary signal and delivers an estimated signal Sh(t) which is equal to H * Shj(t) where H is the filter function of filter F. The estimated signal is subtracted from Shref(t) in subtractor S. The difference signal d(t) delivered by the subtractor is preferably constituted by a sequence of samples and the sum of the squares of this sequence is to be minimized. If the position of each sample is marked n, the following quantity needs to be minimized:

$$E = \sum_{n=0}^{\infty} d^2(t)$$

by modifying the filter coefficients. In this respect, it is known that a digital filter has a transfer function which can be written H(z) where z is a complex variable. The transfer function of such a filter is a sum of terms having the form $h_i$ where $h_i z^{-1}$ are the coefficients of the filter. The filter coefficients hi which minimize the quantity E define the desired deconvolution function.

In another variant, iteration is used in accordance with the so-called conjugate gradient method. This method is described in an article by T. P. Sarkar et al entitled "Deconvolution of Impulse Response from Time-Limited Input and Output: Theory and Experiment" published in IEEE Trans. on Industri. and Meas. vol. IM-34; No. 4, December 1985, herein incorporated by reference.

There is yet another method, as follows. It is known that the perfect theoretical response (no modes, no resonance) of a seismic tool to shaker excitation is proportional to the electrical excitation applied to the terminals of the shaker (if it is a geophone), multiplied by the frequency. If the excitation signal is a constant amplitude sweep of linearly increasing frequency, the theoretical response is thus a sweep of the same linearly increasing frequency, and having an amplitude which likewise increases linearly. The low frequencies of a sweep are thus less well represented than the high frequencies, and the suggested deconvolution method thus runs the risk of being less effective at low frequencies than at high frequencies.

To attenuate this effect, rather than calculating the deconvolution filters on the basis of the raw shaker traces, they are calculated on the basis of the same traces divided by frequency. This is applicable when the reference trace is selected from within the same set of collected shaker data, or from a different set (from a synthesized trace, or from a trace collected during a different measurement campaign).

A filter calculated in this way is usable in the same manner as in the above described method, without requiring an additional operation on the seismic traces.

Although illustrative embodiments of the present invention have been described in detail with reference to the accompanying drawings, it is to be understood that the present invention is not limited to those precise embodiments. Various changes or modifications may be effected therein by one skilled in the art without departing from the scope or spirit of the invention.

What I claim is:

1. A method of processing seismic signals detected by at least one sensor disposed in a tool lowered down a borehole, the seismic signals Sj(t) being recorded at different depths j of the tool in response to the propagation of a seismic wave through the formations surrounding the borehole, said method making use of the signals Shj(t) detected by the sensor at each depth j in response to excitation from a shaker disposed inside the tool, said method comprising the steps of:

defining a reference signal Shref(t) for the excitation response produced by the shaker;

calculating a deconvolution function Dj(t) for each signal Shj(t) picked up at depth j in response to the excitation produced by the shaker in such a manner that the signal Shj(t) picked up at this depth after being convoluted with said deconvolution function Dj(t) gives the reference signal Shref(t); and applying a deconvolution function Dj(t) corresponding to depth j to each seismic signal Sj(t) picked up at said depth j in order to obtain an equalized seismic signal Sjeg(t).

2. The method of claim 1, wherein said reference signal Shref(t) is a synthesized signal.

3. The method of claim 1, wherein said reference signal Shref(t) is selected as being one of said signals Shj(t) picked up at the various depths j whose appearance most closely resembles the appearance of a predetermined ideal signal.

4. The method of claim 1, wherein said at least one sensor comprises three geophones and a shaker, said shaker being disposed along a direction which is the trisector of the axes of the three geophones.

5. The method of claim 1, wherein said shaker is excited by a signal whose frequency increases linearly from a first predetermined frequency to a second predetermined frequency.

* * * * *